United States Patent [19]
Skobel

[11] 3,856,595
[45] Dec. 24, 1974

[54] MEASUREMENT OF DIMENSION OF ELONGATED MATERIAL DURING ITS CONTINUOUS VULCANIZATION

[75] Inventor: Max Skobel, Iselin, N.J.
[73] Assignee: John Royle & Sons, Paterson, N.J.
[22] Filed: Apr. 16, 1973
[21] Appl. No.: 351,592

[52] U.S. Cl.................. 156/64, 73/37.5, 425/113, 425/141, 425/172
[51] Int. Cl. ......................................... G01b 13/08
[58] Field of Search ........ 73/37.5, 37.7; 33/DIG. 2; 425/140, 141, 113, 445, 172; 156/64, 360, 378

[56] References Cited
UNITED STATES PATENTS
3,510,374  5/1970  Walker .............................. 156/64
3,599,288  8/1971  Eakman ............................ 425/172

*Primary Examiner*—Richard C. Queisser
*Assistant Examiner*—Daniel M. Yasich
*Attorney, Agent, or Firm*—Alfred W. Vibber

[57] ABSTRACT

Method of and apparatus for measuring the diameter of elongated vulcanizable material such as the extruded sheath of a cable as the cable travels through an elongated continuous vulcanizing chamber wherein it is subjected to high pressure and temperature. For carrying out such measuring operation, there is provided a fluid jet probe supplied with fluid under a pressure which is greater than the pressure existing in the vulcanizing chamber, the probe penetrating through the wall of the chamber into the interior thereof with its inner, discharge end close to the surface of the travelling material at a location where the longitudinal axis of the travelling material is fixed in direction radially of the side wall of the vulcanizing chamber and thus is fixed relative to the inner end of the probe. The pressure of the fluid reflected by the surface of the material and the pressure of the atmosphere in the vulcanizing chamber are each transmitted to a differential transducer which translates the difference between the two pressures into an electrical signal which can be interpreted by a read-out device in terms of diameter of the material. By the use of a plurality of probes, disposed around the longitudinal axis of the material, a plurality of differential transducers associated with the respective probes, and one or more read-out devices, the degree of eccentricity of a cable sheath relative to the cable core can be continuously monitored.

18 Claims, 6 Drawing Figures

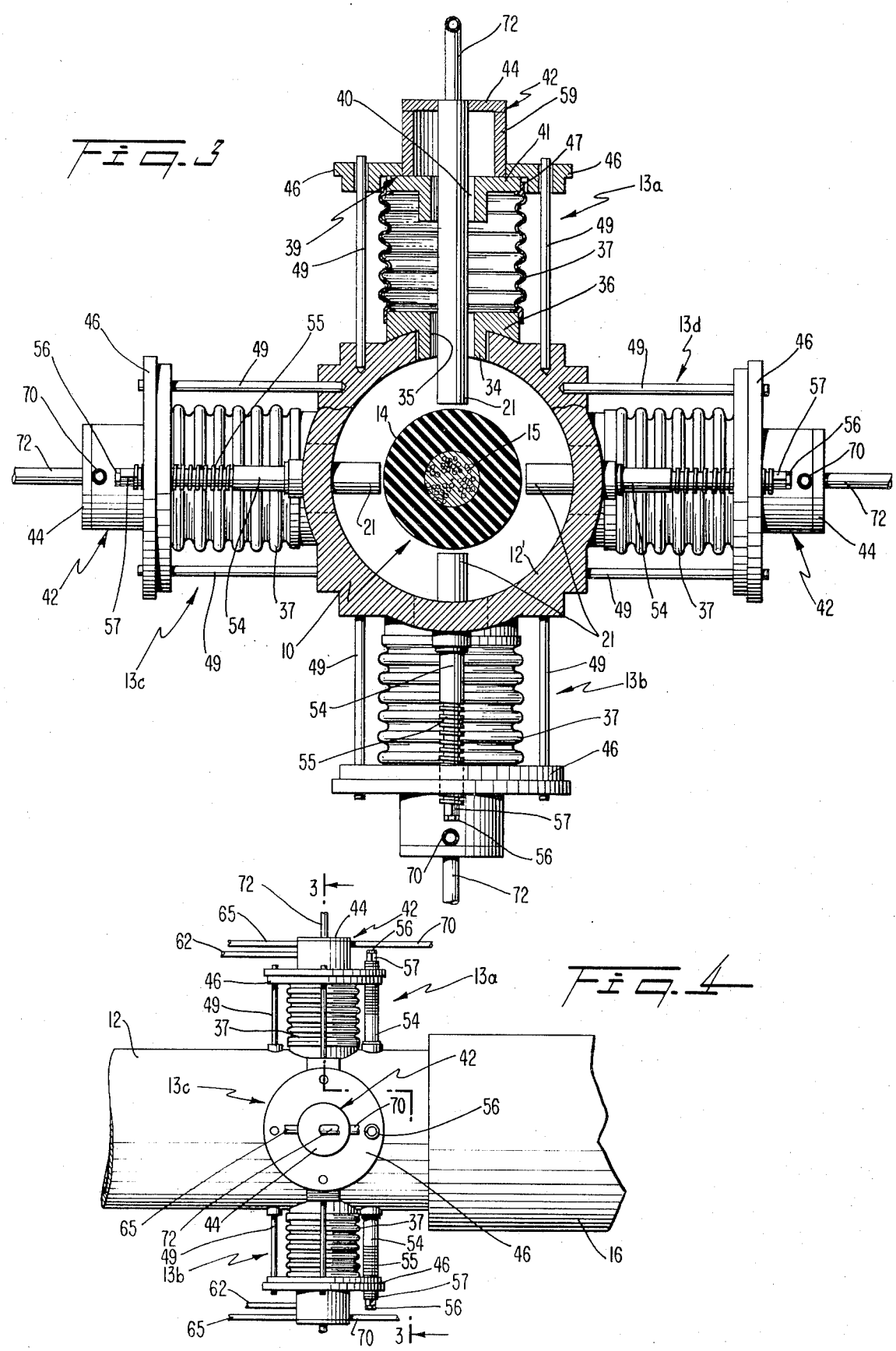

MEASUREMENT OF DIMENSION OF ELONGATED MATERIAL DURING ITS CONTINUOUS VULCANIZATION

This invention relates to a method of and an apparatus for measuring the diameter of elongated vulcanizable material such as the extruded sheath of a cable as the cable travels through an elongated continuous vulcanizing chamber wherein it is subjected to high pressure and temperature. The invention also relates to a method of and an apparatus for determining the degree of eccentricity of a cable sheath relative to the cable core by the use of a number of units of the apparatus made in accordance with the invention.

In conventional continuous vulcanizing apparatus, the vulcanizable material, such as the extruded vulcanizable electrically insulating rubber or rubber-like material forming a sheath on a cable core, immediately after having been applied to the cable core by extrusion enters an elongated continuous vulcanizing chamber wherein it is subjected to pressures on the order of several hundred pounds per square inch and temperatures on the order of several hundred degrees F. Ordinarily the continuous vulcanizing chamber is connected to the discharge or exit end of the extrusion head, so that the extrusion die serves as the entering fluid seal for the continuous vulcanizing apparatus. This results in a simplified construction, eliminating the necessity of a separate seal at the entering end of the vulcanizing chamber. Not only that, but in most cases the extruded material such as the cable sheath is prevented from contact with any fixed structure within the vulcanizing chamber until it has become vulcanized to an extent sufficient to prevent its injury by engagement, for example, with the bottom wall of the vulcanizing chamber.

The above-described construction substantially prevents any visual inspection of the extruded material as it issues from the extruding die, and up until now has prevented any effective measurement of the diameter of the extruded material such as the radial thickness of the sheath on the cable core. Continuous vulcanizing chambers are ordinarily at least one hundred feet in length, an frequently up to 200 or 250 feet long. This means that up until now any effective measurement not only of the thickness of the sheath on the cable core, but also the degree of eccentricity of the core within the finished sheathed product has not been possible until the product has issued from the exit end of the vulcanizing chamber. In the case of large sheathed electrical cables, this may mean the possible loss of at least a length of cable equal to the length of the vulcanizing chamber if the thickness of the sheath and/or the degree of eccentricity of the cable core within the finished product exceeds permissible tolerances. It is obvious that in these circumstances the loss would be quite appreciable, since at best the cable would have to be stripped of its sheath and re-sheathed, and at its worst the cable would have only scrap value.

The invention has among its objects the overcoming of the above-outlined difficulties encountered in continuous vulcanizing apparatus, by providing a novel method of and apparatus for continuously measuring the diameter of an extruded product travelling through a continuous vulcanizing chamber.

A further object of the invention resides in the provision of such measuring method and apparatus wherein the diameter of the extruded product is measured without contacting the product with any solid object.

A still further object of the invention resides in the provision of a method of and an apparatus for continuously measuring the diameter of the product travelling through the vulcanizing chamber by subjecting it to a jet of fluid which is directed thereupon by a measuring probe, detecting pressure variations in the stream of fluid from the jet which is reflected from the travelling surface of the material, and translating such reflected pressure responses into signals which are meaningfully related to variations in the diameter of the product passing by the probe.

A still further object of the invention lies in the provision of a method of and an apparatus for continuously monitoring the degree of eccentricity of a cable core with respect to the cable sheath extruded thereon, the method and apparatus employing a plurality of probe and read-out units, the probes being disposed in angularly spaced relationship about the longitudinal axis of the travelling material, the apparatus including one or more read-out devices which correlate and interpret the responses of the various probes in terms of deviation of the cable core and the cable sheath from concentricity.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 3 is a view in transverse section through a further, different continuous vulcanizing chamber, the chamber being provided with four diameter-measuring probes in accordance with the embodiment of FIGS. 1 and 2 hereof, the section being taken along the broken section line 3—3 of FIG. 4, certain of the parts being shown in elevation;

FIG. 4 is a view in side elevation of a fragment of the vulcanizing chamber at the entering end thereof and of the exit end of the vulcanizing head connected thereto, the view being taken in the direction from left to right in FIG. 3;

Figure 1:
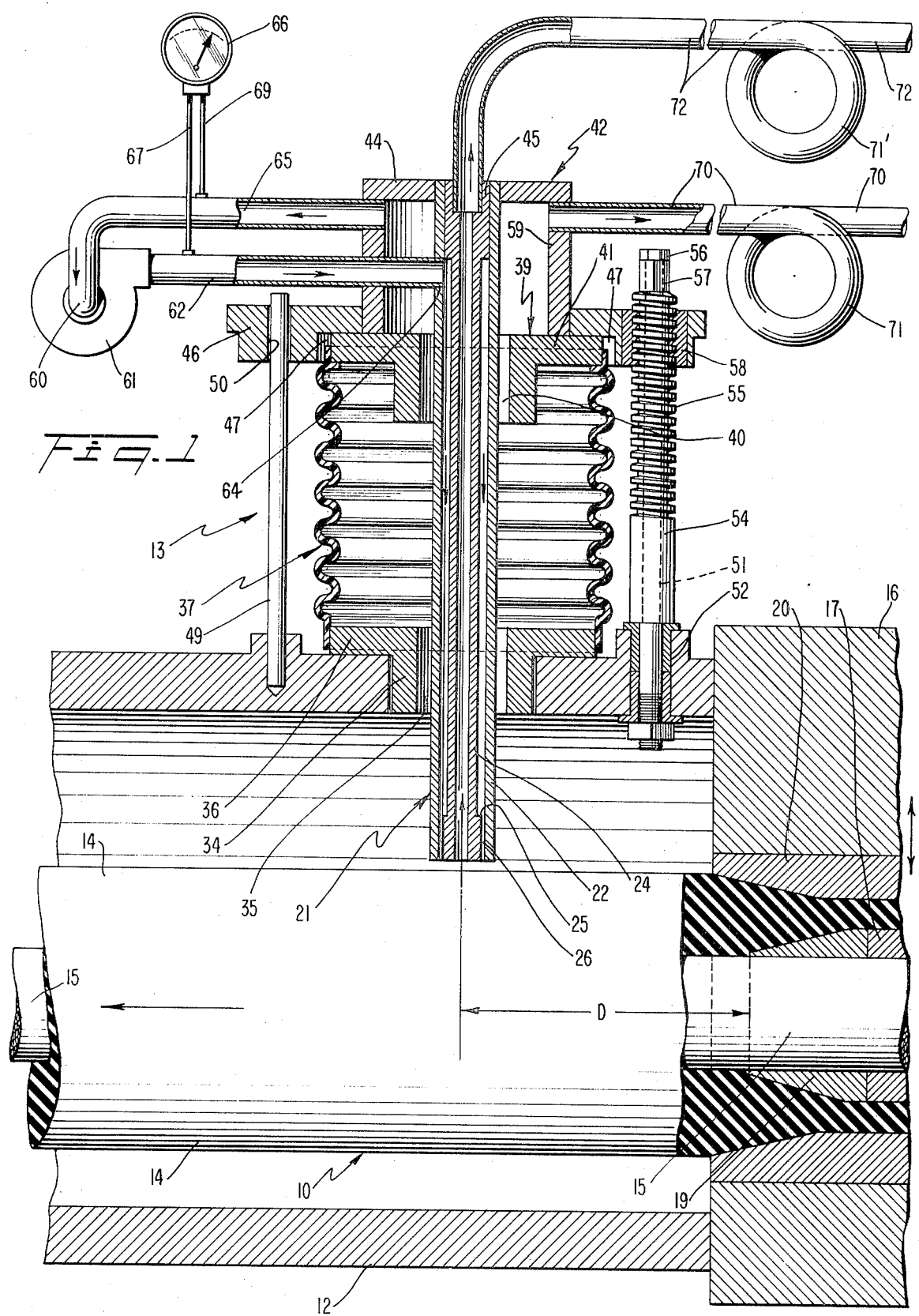
FIG. 1 is a fragmentary view in vertical axial section of the entering end of a continuous vulcanizing chamber and the exit end of a cable-sheathing plastic material extruding head connected thereto, a cable sheath measuring probe being shown mounted at the entering end fo the vulcanizing chamber, certain of the parts being shown in side elevation.

Turning first to FIG. 1, there is shown a fragment of a sheathed cable 10 which is travelling in a direction from right to left in a continuous vulcanizing chamber 12. The cable 10 has a sheath 14 of electrically insulating vulcanizable material, the sheath encasing the cable core 15. The vulcanizing chamber 12 is affixed to and sealed to the schematically shown exit end 16 of a plastic material extrusion crosshead which applies the sheath 14 to the cable core 15 as the core passes through the head. In such travel the cable core passes through a guider tube 17 in the extrusion head and finally through a guider tube tip 19 on the forward or exit end of the guider tube, the guider tube tip 19 being partially telescoped within an annular extrusion die 20 at the exit end of the extrusion head. The die 20 is positioned for adjustment in a transverse plane, by means not shown, in order to correct any condition of placement of the die relative to the guider tube tip 19 which causes the sheath 14 to be other than of uniform radial thickness about the cable core 15. The method and apparatus of the present invention provide the operator of the extrusion apparatus with the information which he needs to adjust the transverse position of the die 20 in order to hold the diameter of the sheathed cable within permissible tolerances, and also to aid in maintaining the cable core 15 concentric with the sheathed cable as a whole.

In brief, the apparatus of the invention includes a fluid jet probe generally designated 21, such probe having an outer tube 22 and an inner tube 24 disposed therewithin concentrically thereof. A shoulder 25 on the inner tube 24 adjacent its forward end forms with the inner surface of the outer tube 22 an annular orifice for directing a jet of fluid under a pressure which exceeds the fluid pressure existing generally within the vulcanizing chamber 12 against the surface of the elongated member 10 passing thereby. A differential pressure transducer 27 (FIG. 2) is continually subjected in its respective parts (1) to the pressure of the general atmosphere within the continuous vulcanizing chamber on the one hand, and (2) the pressure of the fluid from the jet which is reflected from the elongated material into a second, delivery conduit. The results of such differential transducer are imposed upon a Wheatstone bridge 29, the output of which is connected to a rectifier, filter, and amplifier device 30. The output of device 30 is connected to a calibrated galvanometer 32 which preferably reads directly in terms of the actual diameter of the product 10.

Figure 2:
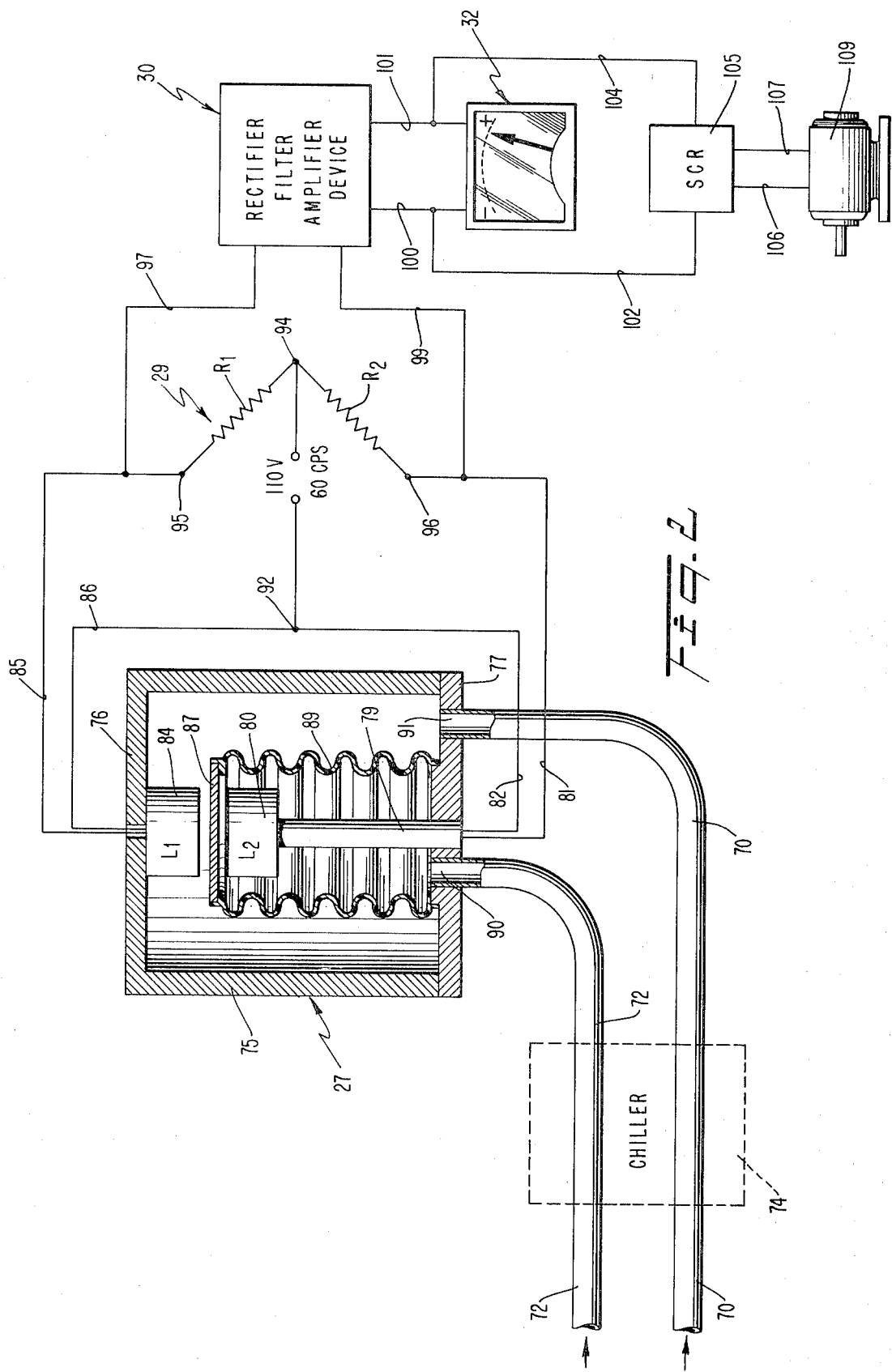
FIG. 2 is a somewhat schematic view in vertical section through a differential pressure-responsive transducer, the transducer being shown connected to a read-out device, which yields readings which may be interpreted in terms of diameter of the travelling material being vulcanized, and to the driving motor of the extruding apparatus with which the measuring system is associated.

We will now proceed to describe the apparatus of FIGS. 1 and 2 in more detail. A flanged fitting 34 is sealed into the upper wall of the chamber 12, the tubular portion of such fitting having a bore therethrough with a diameter somewhat exceeding the outer diameter of the outer tube 22 of the probe, whereby to present an annular passage 35 therebetween. The fitting 34 has a radially outwardly extending annular flange 36 to the outer edge of which there is sealed the lower end of an expansible metal bellows 37. An upper fitting 39, similar to fitting 34, has the outer edge of its flange 41 sealed to the upper edge of the bellows 37. An annular passage 40 is presented between the surface of the bore through the tubular part of the member 39 and the outer surface of the outer tube 22. Supported upon and sealed to the upper surface of the fitting 39 there is an enclosure 42 having a continuous sidewall 59 and a top member 44, the upper end of the outer tube 22 of the probe being sealed to the member 44. The upper end of the inner tube 24 of the probe is of enlarged diameter and is sealed to the upper end of the outer tube 22. There is thus presented a closed space which includes the space within the metal bellows 37 and the space within the enclosure 42, such combined spaces being sealed from the atmosphere and being in free communication with each other through the passage 40 and with the space within the vulcanizing tube 12 through the passage 35. The bellows 37 permits the members 39 and 42 to be adjusted vertically, thereby to adjust the distance between the delivery end of the jet orifice 26 and the surface of the material 10 travelling in the chamber 12.

Such adjustment of the probe is effected as follows: A centrally apertured transverse or horizontally disposed plate 46 to which the lower end of sidewall 59 is affixed has a recess 47 in its lower surface, such recess receiving the flanged upper end portion of the fitting 39. Plate 46 is guided for vertical adjustment by a number of circumferentially spaced vertically disposed guide pins 49, of which one is shown in FIG. 1, the lower ends of such pins being affixed to the outer wall of the vulcanizing chamber 12, the upper ends of the pins 49 being accurately slidably received within vertical passages or bores 50 in the plate 46. A vertical shaft 51 has its lower end affixed to and sealed to the upper side of the chamber 12 by a sealing mounting device 52. A sleeve 54 rotatably mounted upon the shaft 51 has a sleeve 54 at its upper end having an extended worm or screw 55. The sleeve 54 is retained upon the shaft 51 by a nut 46 threadedly engaging the shaft at its upper end. The screw 55 is threadedly received within a nut 58 which is affixed to the plate 46. The screw 55 is rotated as required to adjust the vertical position of the plate 46 and thus of the delivery end of the probe by applying a wrench to the upper squared end portion 57 on the sleeve 54.

The probe 21 is supplied with fluid, preferably gas or steam which is led from chamber 12 through the device 13 and a conduit 65 to the inlet port 60 of a pump 61. The conduit 65 extends through the wall 59 of the enclosure 52, the space within the pipe 65 being at the same pressure as that existing generally within the continuous vulcanizing tube. From the pump, the delivered fluid, now under increased pressure, passes to a conduit 62 which extends through and is sealed to the sidewall 69 of enclosure 42 to the upper end of the annular space which is presented between the inner and outer tubes 24 and 22, respectively. A differential gauge 66, connected to conduits 62 and 65 by small pipes 67 and 69, respectively, indicates the difference in pressure which exists between the fluid in delivery pipe 62 and that in pipe 65. Pipes 62 and 65 are made flexible so as to permit the vertical adjustment of the enclosure 42 without imposing destructive strains upon such pipes.

Connected to the interior of the enclosure 42 through the side wall thereof is a further flexible pipe 70 in which there is interposed a circular expansion portion 71. Connected to the upper end of the inner tube 24 is another flexible pipe 72, such pipe having a circular expansion portion 71'. Pipes 70 and 72 lead to the above referred to pressure differential transducer 27 shown in FIG. 2.

In their travel to the transducer, the pipes 70 and 72 pass through a chilling device or chiller 74 which reduces the temperature of the pipes and their contents to ambient temperature so as to improve unwanted deviations in the functioning of the transducer 27 caused by differences in temperature between the two fluids contained in the respective pipes 70 and 72.

The transducer 27 is contained within an enclosure having a circular cylindrical vertical side wall 75 and upper and lower spaced parallel walls 76 and 77, respectively. A vertically extending rod 79 is affixed to the lower wall 77 of the enclosure. Mounted upon the upper end of the rod 79 is a first electrical coil 80, there being means from the coil 80 brought downwardly through a passage in the rod 79, such leads being designated 81 and 82. Supported upon the lower inner surface of the top closure member 76 is a second electrical coil 84, similar to coil 80, coil 84 having leads 85 and 86. The supporting rod 79 and the coil 80 mounted thereon are disposed within a flexible metal bellows 89 which is expansible in a vertical direction, the lower end of the bellows being affixed to the lower wall 77 of the enclosure, and the upper end of the bellows being closed by disc-shaped armature 87 made of magnetic metal. The delivery end of the pipe 72 is connected at 90 to the space within the bellows 89. The delivery end of the pipe 70 is connected at at 91 to the enclosure, specifically to the space within the enclosure which surrounds the metal bellows 89 and the coil 84. The parts are so constructed and arranged that the armature 87 always occupies a position intermediate between the opposing poles of the respective coils 80.

The lead wires 82, 86 are connected together and to a junction 92 of a Wheatstone bridge. The lead wires 81, 85 are connected to diagonally spaced opposed junctions 95, 96 of the bridge. It will be seen that the coils 80 and 84 constitute two serially connected arms of the bridge. The other two arms of the bridge are constituted by resistance $R_1$ and $R_2$ which are connected to a common junction 94. The bridge is supplied with 110 V, 60 cycle per second currents by terminals connected to the respective junctions 92, 94 as shown.

It will be seen that the exterior of the bellows 89 is subjected to the fluid pressure which generally exists within the continuous vulcanizing chamber 12, and that the space within the bellows 89 is connected to the delivery end of the inner probe tube 24 and is thus subjected to the combined pressure of the atmosphere generally existing within the vulcanizing chamber and that resulting from the reflection of the fluid jet by the material 10 passing thereby. Variations in the latter quantity, which occur when the diameter of the product 10 varies, causes the armature 87 to rise and fall and thus to disturb the magnetic field between the coils 80 and 84 and, as a consequence, the magnitude of the inductances $L_2$ and $L_1$, and thus the voltages across such coils. The degree of imbalance between such voltages is detected by the rectifier, filter, and amplifier device 30 which is connected to the opposite terminals 95, 96 of the bridge through wired 97, 99, respectively.

The output of device 30 is led through leads 100 and 101 to a read-out device 32 which may be in the form of a galvanometer, device 32 being preferably calibrated to give a direct reading of the instantaneous diameter of the product 10. The measuring system shown may also be employed to control the speed of the motor 109 which drives the extruding apparatus so as to correct any undue deviation in the diameter of the extruded product. Motor 109 is connected to an SCR device 105 through wired 100, 101 by wires 102, 104, respectively. The system is so arranged that when the extruded product has an unduly small diameter the speed of motor 109 and thus the speed of extrusion of the product is increased, and when the diameter of this extruded product is to large, the speed of motor 109 is decreased.

The probe 21 is preferably mounted in the entering end of the vulcanizing chamber 12 and as close as is feasible to the delivery and of the extrusion head. The cabel core 15, as above-described, travels through the guider tube 17 and through the tip 19 thereof. In its passage through the tip 19 the core is accurately guided, so that its longitudinal axis is fixed. Preferably the distance D (FIG. 1) between the delivery end of the guider tube tip 19 and the axis of the probe 21 is small, so as to assure the positioning of the axis of the cable core in a line which is fixed at the location of the probe 21.

Although the continuous vulcanizing system may be of the so-called "catenary" type, shown in U.S. Pat. No. 3,108,321 dated Oct. 29, 1963, and that thus the probe 21 in such case, although disposed at a right angle to the path of the cable 10 therepast, is tipped at an appropriate angle with respect to the vertical.

The embodiment of the invention illustrated in FIGS. 3–6, inclusive, measure the degree of eccentricity of the core 15 of the cable 10 with respect to its overall dimensions. These embodiments employ a plurality of pairs of opposed probes, here designated 13a, 13b, as one pair thereof; and 13c and 13d, as another pair thereof, for measuring the diameter at opposed zones spaced 180° apart, such pairs of probes, in turn, being spaced 90° apart. The result of the measurements of each probe of each of a set of probes are compared with the results of the other probe of such pair so as to give a precise indication of the difference of the radius of the sheath at two zones spaced 180° apart. Assuming the position of the core of the cable to be fixed along its longitudinal line of travel, the difference in radial dimensions measured by the said first opposed pair of probes yields an indication of the degree of eccentricity of the core in the cable in the plane of said first two said opposed probes. The same is true of the probes of the second pair, which, as above noted, are disposed in a plane at right angles to the plane of the first two such pair of probes. In the embodiments shown, the two sets of probes are connected to respective read-out devices which yield separate readings as to the difference in radial thickness of the sheath of the cable in said two planes disposed at right angles with respect to the axis thereof. These readings can be readily interpreted by the operator of the apparatus, in certain embodiments thereof, or directly in others, to show him the degree of and direction of eccentricity of the cable sheath with respect to the core. When all of such readings of the various probes are equal, it is obvious that the cable core lies concentric with the axis of the sheath.

Turning now to the detailed constructions of FIGS. 3–6, inclusive:

The probe 13a and 13b, as one pair, and 13c and 13d, as the other, shown specifically in FIG. 3, are of the same construction as the probe 13 above-described in connection with FIG. 1; such four probes are disposed in a transverse plane close to the delivery end of the cross head of the extruder, with a spacing between the probes and the crosshead similar to that in FIG. 1. Parts which are the same in FIG. 3 as in FIG. 1 are designated by the same reference characters. The two pairs of probes 13a, 13b and 13c, 13d are disposed in the same plane transverse of the vulcanizing chamber 12', as shown in FIG. 4. The pressure differential results of the various probes in the system of FIGS. 3 and 4 are interpreted alternatively by a first further embodiment of read-out device, shown in FIG. 5 and by a second further embodiment of read-out device shown in FIG. 6, both of which will be described hereinafter.

Figure 5:
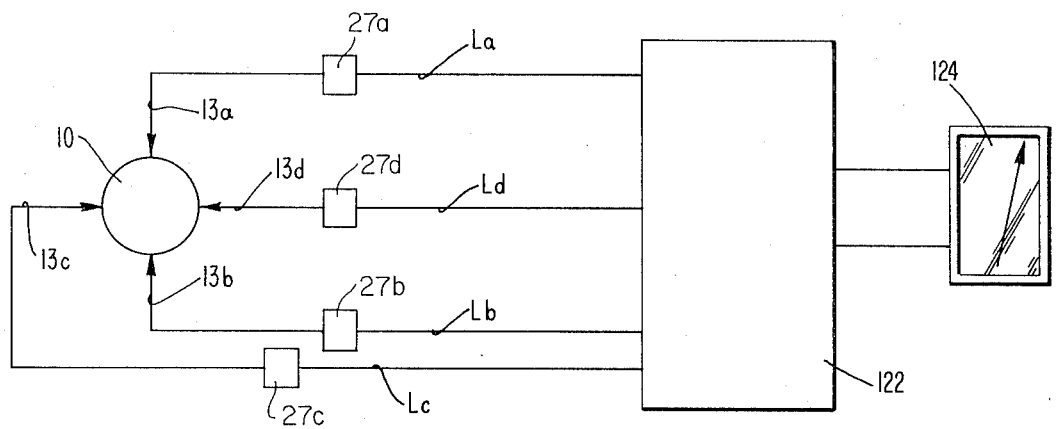
FIG. 5 is a schematic view of a continuous vulcanizing system incorporating the concentricity measuring apparatus of FIGS. 3 and 4 and employing a first embodiment of read-out device therefor.

In the system schematically shown in FIG. 5 the probes 13a, 13b, 13c, and 13d are provided with differential pressure transducers 27a–27d, inclusive, respectively. From the respective differential pressure transducers, their lead wires $L_a$–$L_d$, respectively, which are connected to a control device 122 in the nature of a "black box," wherein the results from the pairs of devices 13a, 27a–13b–27b, on the one hand and 13c–27c and 13d and 27d on the other, are combined vectorially to yield a direct reading on the meter 124 in terms of percent eccentrically on the sheath with reference to the core.

Figure 6:
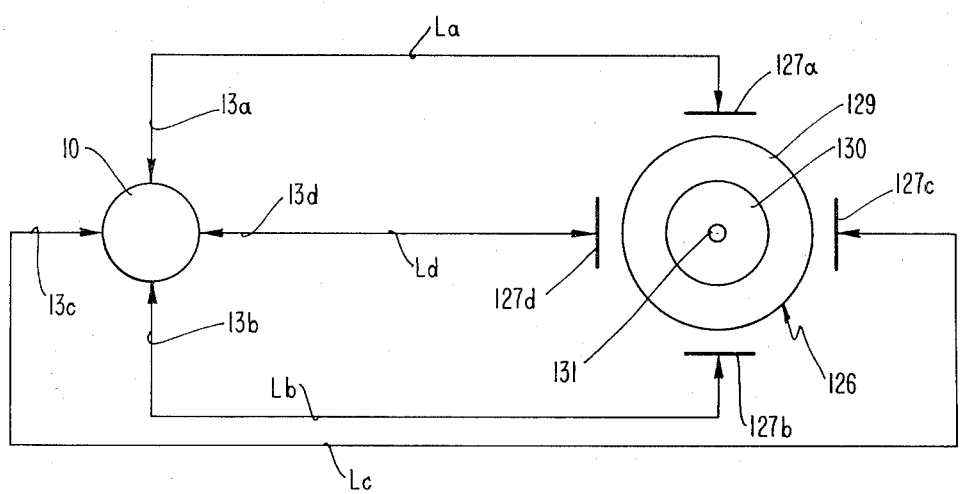
FIG. 6 is a view similar to FIG. 5 of a system employing a second embodiment of read-out device for the concentricity measuring apparatus.

In the system schematically shown in FIG. 6, the combinations of opposed pairs of probes and of differential pressure transducers associated therewith is the same as FIG. 5. In this case, however, the lead wires $L_a$ and $L_b$ lead to respective, opposed deflection plates 127a and 127b of a cathode ray tube 126. Lead wires $L_c$ and $L_d$ lead to respective deflection plates 127c and 127d of the cathode ray tube. The tube has a front face 130 upon which there is a phosphorescent coating which is made visible by a trace pencil 131 of cathode rays. When the fields set up between the opposed pairs of deflection plates are equal, the cathode ray beam 131 lies contrally of the face 130 of the cathode ray tube, thereby indicating that the core and sheats of the cable are concentric. When, however, the core and sheath are eccentric, the trace 131 of the cathode reay beam will lie eccentric with respect to the center of the face 130 of the cathode ray tube. The degree of eccentricity and its direction with respect to the face 130 will instantly give the operator of the apparatus an indication of the amount and direction of eccentricity of the sheath with respect to the core. If desired, the face 130 of the cathode ray tube may be provided with graduations extending both radially and concentrically with its center whereby the operator may read the amount of eccentricity and its direction instantaneously.

Although the invention is illustrated and described with reference to a plurality of preferred embodiments, it is to be expressly understood that it is in no way limited to the disclosure of such preferred embodiments, but is capable of numerous modifications within the scope of the appended claims.

What is claimed is:

1. The method of detecting radial deviations in position of the surface of an elongated vulcanizable material of generally uniform transverse section travelling in a predetermined path through a continuous vulcanizing chamber wherein it is exposed to a fluid vulcanizing atmosphere at elevated pressure and temperature, the vulcanizable material being a sleevelike extruded sheath on a cable having a central, axially directed core, comprising directing a jet of fluid at a pressure above said elevated pressure through one end of a probe against a zone of the surface of the material as it travels within the chamber, axially guiding the core of the cable along a fixed path at a location close to the location of the jet, and detecting, by indicating means connected to the opposite end of the probe, deviations in the fluid from the jet which is reflected from said zone of the surface of the travelling material.

2. The method according to claim 1, comprising detecting deviations in the pressure of the fluid from the jet which is reflected from the surface of the material.

3. The method according to claim 1, comprising opposing the pressure of the fluid from the jet which is reflected from the surface of the material by the pressure of the vulcanizing atmosphere in the chamber and detecting deviations in the resultant of such two opposed pressures.

4. The method according to claim 3, comprising equalizing the temperature of portions of the vulcanizing atmosphere and of the fluid from the jet which is reflected from the surface of the material, and thereafter placing the pressures of said temperature-equalized portions in opposition.

5. The method according to claim 3, comprising translating the deviations in the resultant of the two opposed pressures into deviations in an electrical phenomenon, and monitoring said electrical phenomenon as a measurement of variations in the diameter of the material.

6. The method according to claim 1, wherein the vulcanizing atmosphere in the chamber is gaseous, and the fluid from the jet is gaseous.

7. The method according to claim 1, comprising directing a plurality of jets angularly spaced about the longitudinal axis of the chamber against respective zones of the surface of the travelling material within the chamber, and detecting deviations in the pressure of the fluid from each of the jets which are reflected from the respective zones of the surface of the travelling material whereby to detect variations in the radius of the material at each of said zones.

8. The method according to claim 7, wherein the vulcanizable material is the sleeve-like sheath extruded on a cable having a central, axially directed core, and wherein the core of the cable is axially guided along a fixed path at a location close to the location of the jets.

9. The method according to claim 8, comprising comparing the deviations in the pressures of the fluid from each of the jets which are reflected from the respective zones of the surface of the travelling material, and translating the said compared deviations in the pressures of the reflected jets into a measurement of the eccentricity of th core of the cable with respect to the sheath of the cable.

10. Apparatus for detecting radial deviations in position of the surface of an elongated vulcanizable material of generally uniform transverse section travelling in a predetermined path through a continuous vulcanizing chamber wherein it is exposed to a fluid vulcanizing atmosphere at elevated pressure and temperature, the vulcanizable material being a sleeve-like extruded sheath on a cable having a central, axially directed core, comprising a probe means at a pressure above said elevated pressure through one end of said probe for directing a jet of fluid against a zone of the surface of the material within the chamber, said probe being connected through a wall of said chamber, means for axially guiding the core of the cable along a fixed path at a location close to the location of the jet, and indicating means connected to said probe for sensing and detecting deviations in the fluid from the jet which is reflected from said zone of the surface of the travelling material.

11. Apparatus according to claim 10, comprising means for detecting deviations in the pressure of the fluid from the jet which is reflected from the surface of the material.

12. Apparatus according to claim 10, comprising means for placing in opposition the pressure of the vulcanizing atmosphere in the chamber and the pressure of the fluid from the jet which is reflected from the surface of the material, and means for detecting deviations in the resultant of such two opposed pressures.

13. Apparatus according to claim 12, comprising means for equalizing the temperature of portions of the vulcanizing atmosphere and of the fluid from the jet which is reflected from the surface of the material, and means for thereafter placing the pressures of said temperature-equalized portions in opposition.

14. Apparatus according to claim 12, comprising means for translating the deviations in the resultant of the two opposed pressures into deviations in an electrical phenomenon, and means for monitoring said electrical phenomenon as a measurement of variations in the diameter of the material.

15. Apparatus according to claim 10, wherein the vulcanizing atmosphere in the chamber is gaseous, and the fluid from the jet is gaseous.

16. Apparatus according to claim 10, comprising a plurality of jets angularly spaced about the longitudinal axis of the chamber against respective zones of the surface of the travelling material within the chamber, and means for detecting deviations in the pressure of the fluid from each of the jets which is reflected from the respective zones of the surface of the travelling material.

17. Apparatus according to claim 16, wherein the vulcanizable material is a sleeve-like sheath extruded on a cable having a central, axially directed core, and wherein the core of the cable is axially guided along a fixed path at a location close to the location of the jets.

18. Apparatus according to claim 17, comprising means for comparing the deviations in the pressures of the fluid from each of the jets which are reflected from the respective zones of the surface of the travelling material, and means for translating the said compared deviations in the pressures of the reflected jets into a measurement of the eccentricity of the core of the cable with respect to the sheath of the cable.

* * * * *